UNITED STATES PATENT OFFICE.

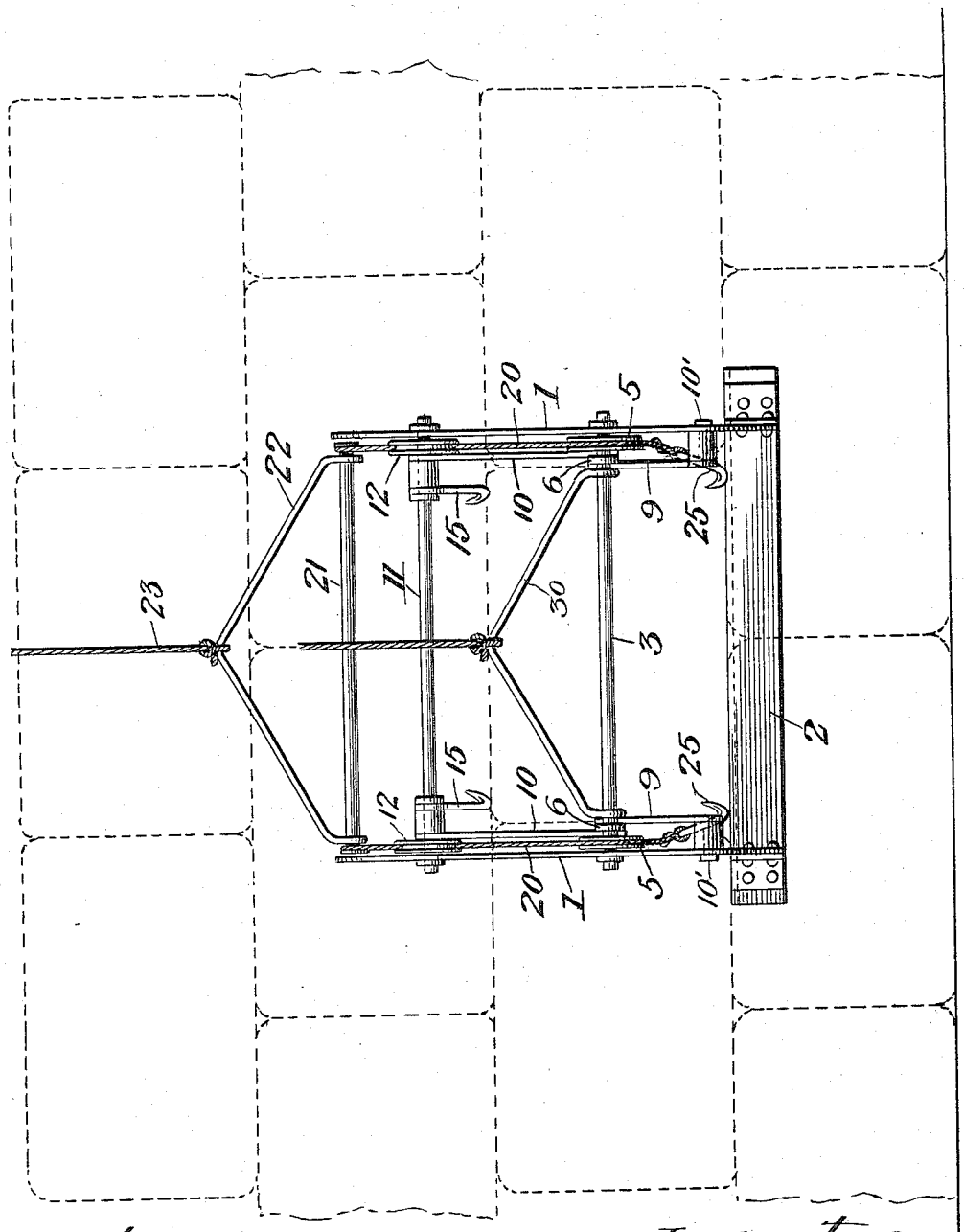

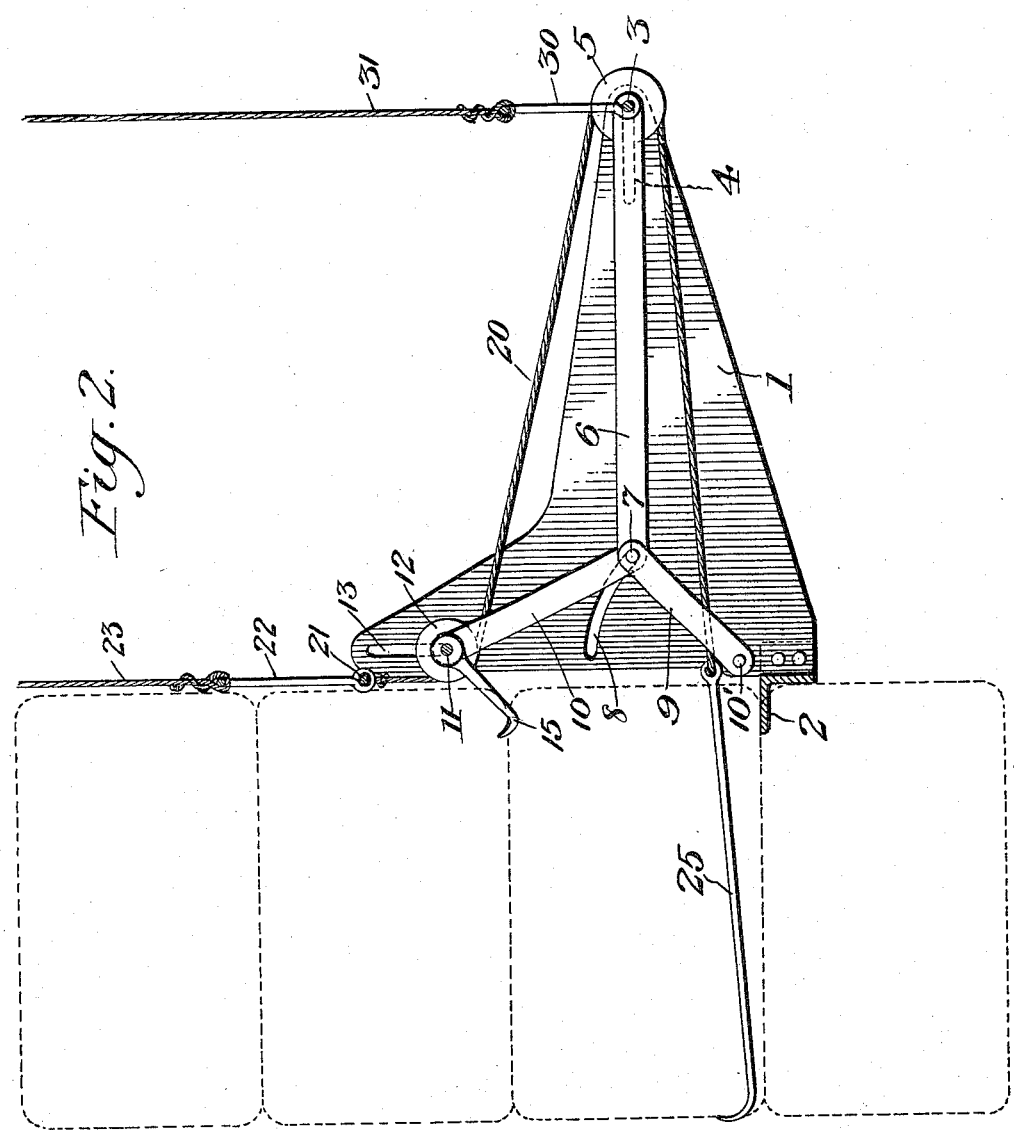

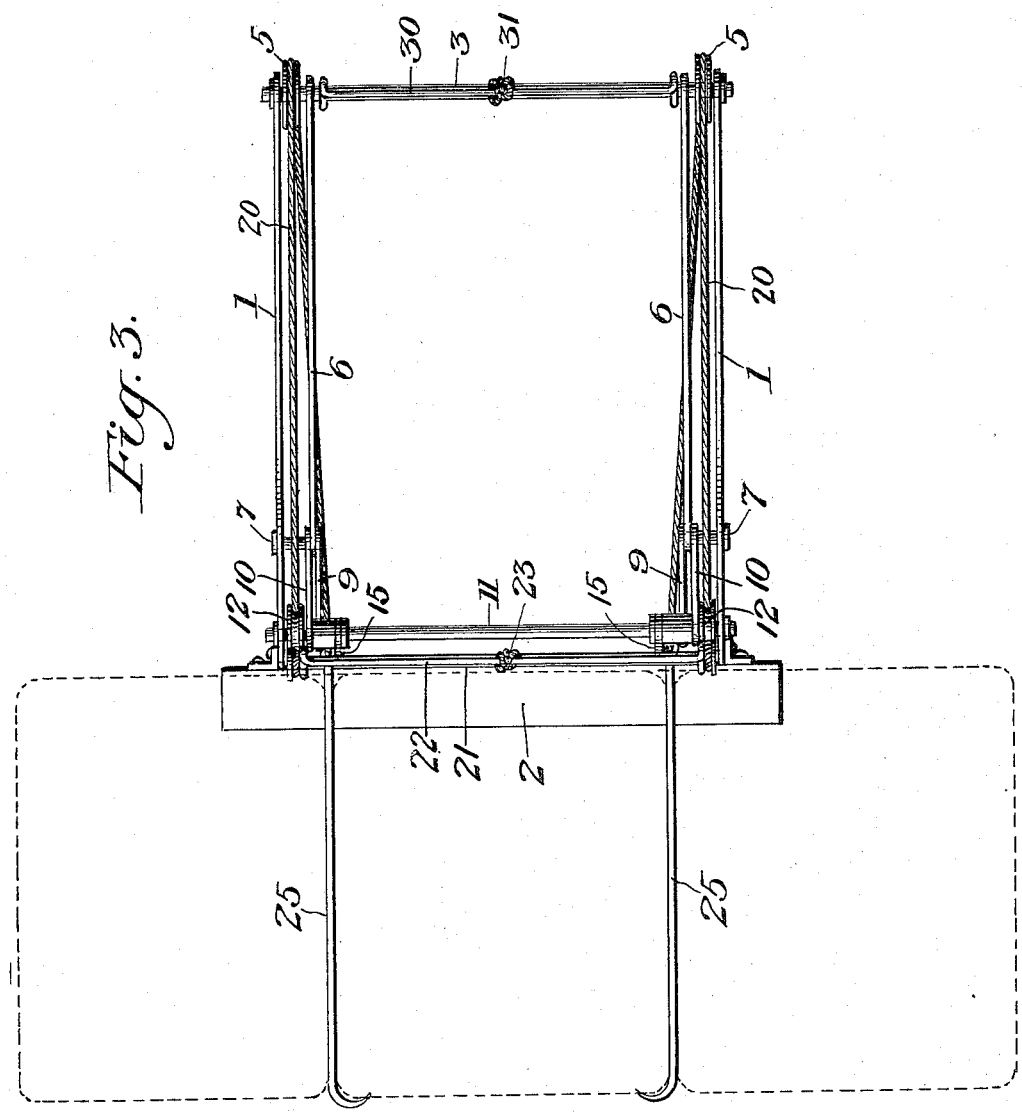

WILLIAM von PHUL, OF NEW ORLEANS, LOUISIANA, ASSIGNOR TO FORD, BACON & DAVIS, OF NEW YORK, N. Y., A FIRM.

BALE OR PACKAGE REMOVING MECHANISM.

1,149,310.

Specification of Letters Patent. Patented Aug. 10, 1915.

Application filed March 13, 1915. Serial No. 14,188.

*To all whom it may concern:*

Be it known that I, WILLIAM VON PHUL, a citizen of the United States, and resident of New Orleans, parish of Orleans, State of Louisiana, have invented certain new and useful Improvements in Bale or Package Removing Mechanism; and I do hereby declare the following to be a full, clear, and exact description of the invention, such as will enable others skilled in the art to which it appertains to make and use the same.

The invention relates to mechanism for withdrawing or removing bales, packages or other containers of goods in bulk, or separate articles, from piles of the same, and involves the same general mode of application and operation as the apparatus described and claimed in the joint application filed by the applicant, Alexander L. Black and Andrew M. Lockett, of even date herewith, the present invention involving certain structural changes and operative features which are designed to make the apparatus somewhat less in weight and also somewhat simpler and more positive in the conjoint operation of lifting superposed bales and withdrawing the desired bale from the pile.

The invention is illustrated in the accompanying drawings, in which,

Figure 1 is a front elevation of the apparatus in position to remove or extract a bale from a pile of the same. Fig. 2 is a vertical longitudinal cross section through the machine showing the parts in operative position, and Fig. 3 is a plan view of the same.

Referring to the drawings, the machine involves a supporting frame including two side members 1, 1, which may be made of sheet metal, or, if desired, may be constructed of suitable metal sections. Connecting the lower rear portions of the side members 1 is an angle bar 2, which is adapted to be shoved between the bale to be removed and the next bale below. The forward portions of the side members are connected by a cross rod or shaft 3. The side members 1 are spaced sufficiently far apart to permit the extracted bale to pass between the said side members and the operating mechanism mounted thereon, after the said bale has been pulled from the pile. Mounted upon the inner face of each of the side members 1 is a lever system adapted to be operated by the particular means which effects the withdrawal of the bale, to engage and raise the bales superposed on the bale to be removed. Each of said lever systems comprises a toggle lever consisting of a member 9 pivoted at 10′ to the corresponding side frame 1 and having at its other end a pivot 7 to which the other toggle member is connected, said pivot 7 working in an arc-shaped slot 8 struck from the pivot 10′ as a center. The upper end of each of the toggle members 10 is connected to a cross shaft 11 which is guided for vertical movement in slots 13 in each of the side plates 1. Connected to the pivot 7 of the toggle members 9 and 10, on each side of the machine, is a rod 6 which serves to move the toggle in and out and thereby cause the free end of the toggle to rise and fall. The outer ends of the rods 6 are connected to the cross shaft 3 in the forward end of the frame, which shaft 3 is mounted in longitudinal slots 4 in the outer ends of the plates 1, said slots defining the limits of the movement of the rod 6.

Secured to the cross shaft 11, on opposite sides of the machine, are hooks or similar bale engaging means 15, adapted to engage the forward bottom portions of the bales superposed on the bale to be extracted, so that when the two link members 9 and 10 of the toggles are straightened out, the upward movement of the free ends of the links 10 causes a corresponding movement of the shaft 11 and the hooks or other superposed bale engaging members, thereby lifting the superposed bales correspondingly.

Mounted on the opposite ends of the cross shafts 3 and 11 are pulleys or sheaves 5, 5 and 12, 12 respectively, and passing under the pulleys 12 and around the pulleys 5 are two cable sections 20, which are connected at their free ends to long hooks or other bale engaging elements 25, which latter are adapted to be shoved between the sides of the bale to be removed and the adjacent bales until the hook ends engage the rear ends of the desired bale, as indicated in Figs. 2 and 3. The other ends of the cable sections are secured to the cross bar 21 of a sling or yoke 22, which in turn is supported by a cable 23 running to a suitable hoisting drum or similar apparatus upon a traveling crane or other overhead support.

The forward end of the apparatus is supported by a rope or cable 31 which may also run to the overhead crane, which cable is connected at its lower end to a sling or yoke 30 secured to the cross shaft 3.

The operation of the apparatus is as follows: The frame is moved by the crane or other overhead operating mechanism to a position in front of the pile of bales, and immediately in front of the bale to be extracted. The frame is then moved into a position to force the horizontal flange of the cross brace 2 between the bale to be extracted and the bales lying immediately below the same. The hooks 25 are then shoved longitudinally of the bale to be removed on either side thereof until the hook ends can be engaged with the rear face of the bale, as indicated in Figs. 2 and 3. The cable 23 is then taken up by the drum or other winding device on the overhead crane and the pull on the cable 23 effects first a straightening movement of the toggle levers 9 and 10, due to the upward pull of the cable sections 20 on the pulleys 12 and the horizontal pull of the cable sections 20 on the pulleys 5. This has the effect of moving the shafts 11 and 3 and the pivot 7 toward the other end of the slots from the position shown in Fig. 2, and the upward movement of shaft 11 causes the hooks 15 to lift the bales immediately above the bale to be removed and to first relieve the latter of the larger portion of the weight of the superposed bales. The continued upward movement of the cable 23 causes cable sections 20 on either side of the machine frame to be taken up, running around the forward pulleys 3 and under the rear pulleys 12, thereby drawing out the hooks 25 and the bale to which said hooks are attached, the complete removal of the bale being greatly facilitated by the lifting of the superposed bales as described. It will be particularly noted that the cross brace 2 affords an efficient anchor and abutment for the downward and rearward stress imposed on the mechanism, while the reaction of the cable sections 20 on the forward pulleys 3 tends to force the frame toward the pile and hold the framework firmly and securely in place, so that the outward pull of the lower reaches of the cable sections 20 is steady and direct and serves to slide the desired bale quickly from its position in the pile and ultimately to dump the bale on the floor in front of the pile. After the bale has been extracted or withdrawn from the pile, the cable 23 is paid out sufficiently to permit the bales above the space from which the desired bale was removed to settle down, when the parts of the machine will resume the relation shown in the figures of the drawing and the apparatus can then be moved to another position to continue its operation.

What I claim is:—

1. A machine for removing bales and packages from piles of the same, comprising a frame adapted to abut the face of the pile, a lever system carried by said frame adapted to engage and lift bales superposed on the bale to be removed, means for engaging the bale to be removed, and means connected with said lever system and the bale engaging means to operate the lever system to raise the superposed bales and to withdraw the bale engaging means and the bale.

2. A machine for removing bales and packages from piles of the same, comprising a frame adapted to abut the face of the pile, a lever system carried by said frame adapted to engage and lift bales superposed on the bale to be removed, means for engaging the bale to be removed, and cable mechanism connected with said lever system and the bale engaging means to operate the lever system to raise the superposed bales and to withdraw the bale engaging means and the bale.

3. A machine for removing bales and packages from piles of the same, comprising a frame adapted to abut the face of the pile, toggle levers carried by said frame, means connected with said toggle levers to engage and lift the bales superposed on the bale to be removed, means to engage the bale to be extracted, and means for operating the toggle levers to lift the superposed bales and for moving the bale engaging means to withdraw the bale.

4. A machine for removing bales and packages from piles of the same, comprising a frame adapted to abut the face of the pile, toggle levers carried and guided by said frame, means connected to said toggle levers to engage and lift the bales superposed on the bale to be removed, rods connected to said toggle levers to operate the same, cable guides mounted on the free ends of the toggle levers and the rods respectively, means to engage the bale to be removed, and cable sections engaging the guides and connected with the means engaging the bale to be removed, whereby a hauling strain on the cable sections will straighten the toggle levers, lift the superposed bales and withdraw the desired bale.

5. A machine for removing bales and packages from piles of the same, comprising a frame including side members and a cross member adapted to engage the face of the pile, toggle levers supported and guided by the side members and having means to engage and lift bales superposed on the bale to be removed, rods connected to said toggle levers to operate the same, cable guides mounted on the free ends of said toggle levers and of the rods respectively, hooks engaging the bale to be removed, cable sections engaging the guides and connected with the hooks, and a lifting cable connected to said cable sections whereby a hauling strain on
5 the lifting cable will strain the toggle levers, lift the superposed bales and withdraw the desired bale.

In testimony whereof I affix my signature, in presence of two witnesses.

WILLIAM von PHUL.

Witnesses:
A. FISCHER,
VAL VEHMANN.

Copies of this patent may be obtained for five cents each, by addressing the "Commissioner of Patents, Washington, D. C."